US008042425B2

(12) United States Patent
Dujardin

(10) Patent No.: US 8,042,425 B2
(45) Date of Patent: Oct. 25, 2011

(54) MULTI-AXIS ROBOT FOR HIGH-SPEED APPLICATIONS

(75) Inventor: Paul-Eric Dujardin, Sainghin en Weppes (FR)

(73) Assignee: Pilz GmbH & Co. KG, Ostfildern (DE)

( * ) Notice: Subject to any disclaimer, the term of this patent is extended or adjusted under 35 U.S.C. 154(b) by 564 days.

(21) Appl. No.: 12/268,651

(22) Filed: Nov. 11, 2008

(65) Prior Publication Data

US 2009/0155039 A1    Jun. 18, 2009

(30) Foreign Application Priority Data

Nov. 12, 2007    (EP) ..................................... 07021907

(51) Int. Cl.
*G05G 11/00*    (2006.01)
*F16H 19/06*    (2006.01)
(52) U.S. Cl. .................................... 74/490.09; 74/89.22
(58) Field of Classification Search .................... 74/89.2, 74/89.22, 490.04, 490.07, 490.09; 33/1 M; 248/20, 137, 143; 108/657, 661, 913; 901/21
See application file for complete search history.

(56) References Cited

U.S. PATENT DOCUMENTS

| | | | | |
|---|---|---|---|---|
| 2,785,941 A | * | 3/1957 | Sutherland et al. ............... | 346/8 |
| 4,315,437 A | * | 2/1982 | Etcheparre et al. .......... | 74/89.22 |
| 4,327,596 A | * | 5/1982 | Simon ............................ | 74/89.2 |
| 4,420,886 A | * | 12/1983 | Amano .......................... | 33/1 M |
| 4,600,083 A | * | 7/1986 | Parent et al. .................... | 33/1 M |
| 4,976,582 A | | 12/1990 | Clavel | |
| 6,732,609 B2 | * | 5/2004 | Asai et al. .................. | 74/490.04 |
| 7,851,726 B2 | * | 12/2010 | Fustinoni ................. | 219/121.78 |

FOREIGN PATENT DOCUMENTS

| | | |
|---|---|---|
| DE | 44 44 523 A1 | 6/1996 |
| EP | 1 054 188 A2 | 11/2000 |
| WO | WO 96/37346 | 11/1996 |
| WO | WO 97/02931 | 1/1997 |

* cited by examiner

*Primary Examiner* — Thomas R Hannon
*Assistant Examiner* — Phillip A Johnson
(74) *Attorney, Agent, or Firm* — Harness, Dickey & Pierce, P.L.C.

(57) ABSTRACT

A multi-axis robot for high-speed applications comprises a first and a second guide rail arranged substantially parallel to each other for defining a first axis of motion. A crossbar having a first end and a second end is moveably supported on the guide rails. A carriage is moveably coupled to the crossbar for moving along a second axis of motion. A first drive system having first and second drives and a first belt running along a first H-shaped belt path provides for a movement of the carriage along the first and second axis of motion. Second and third belts extend at least partially along the crossbar and the guide rails. The second and third belts run along different second and third belt paths, with one of the second and third belts entering the crossbar with a right-hand turn and leaving the crossbar with a left-hand turn, and the other one of the second and third belts entering the crossbar with a left-hand turn and leaving the crossbar with a right-hand turn.

10 Claims, 3 Drawing Sheets

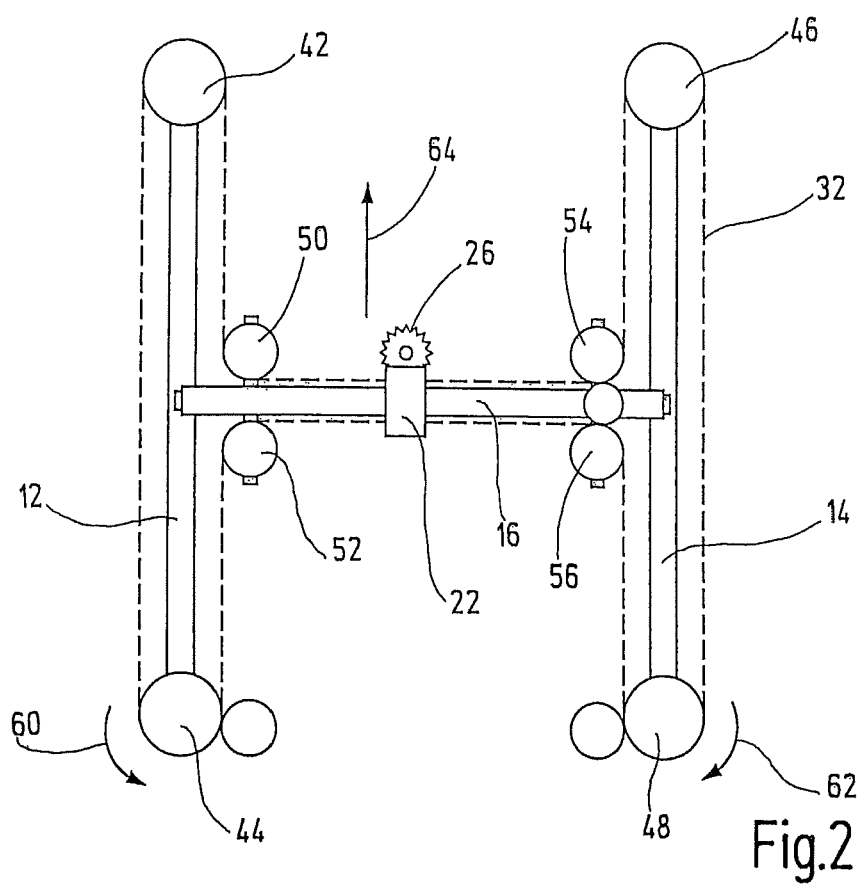
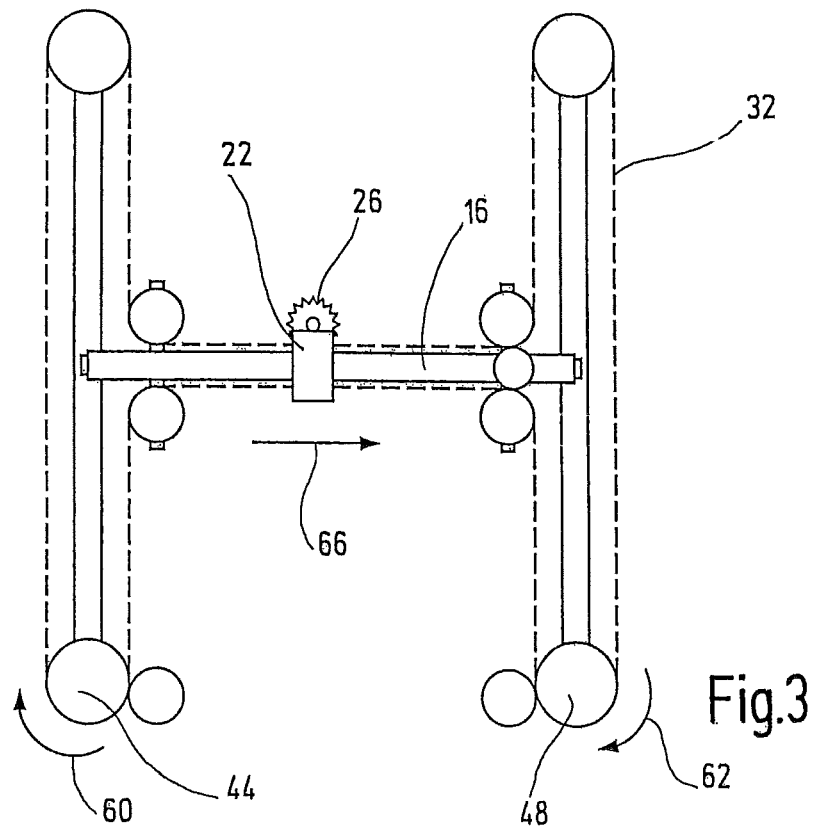

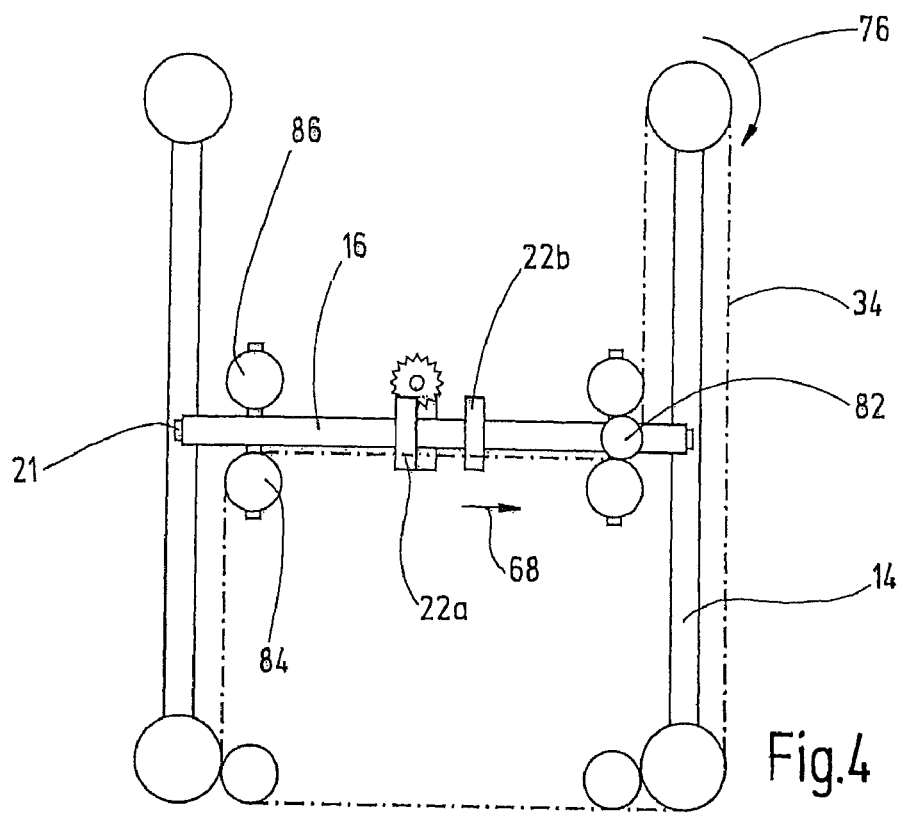
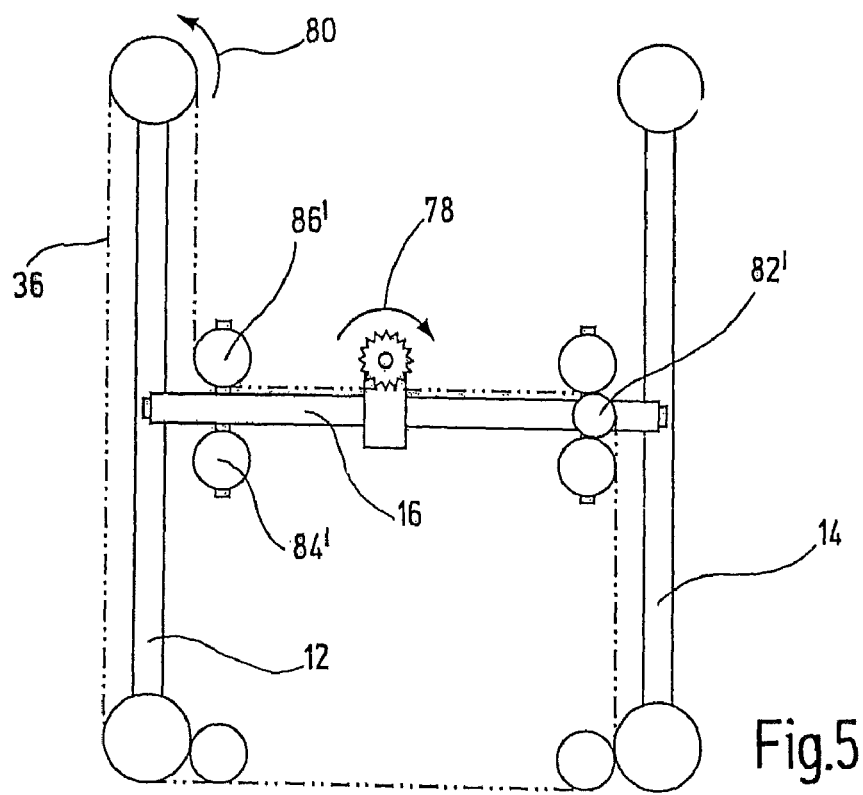

MULTI-AXIS ROBOT FOR HIGH-SPEED APPLICATIONS

CROSSREFERENCES TO RELATED APPLICATIONS

This application is filed in accordance with the Paris Convention and claims priority from European patent application 07 021 907.6 filed on Nov. 12, 2007 with the European Patent Office. The entire content of this priority application is incorporated herein by reference.

BACKGROUND OF THE INVENTION

The present invention relates to a multi-axis robot for high-speed applications, and, more particularly, to a multi-axis robot comprising a first and a second guide rail arranged substantially parallel to each other for defining a first axis of motion, and a crossbar for defining a second axis of motion.

German patent application DE 44 44 523 A1 discloses a multi-axis robot using three belt drive systems for moving a tool carrier along three orthogonal axes X, Y, Z, and for rotating the tool carrier about one of these axes. The tool carrier is arranged on a carriage, which in turn is moveably supported on a crossbar. Each end of the crossbar is supported on one of two parallel guide rails. Therefore, the crossbar and the carriage provide for a movement of the tool carrier along two orthogonal axes, which are typically called X-axis and Y-axis. In order to move the carriage and the crossbar along these two axes, a drive system is provided which comprises two stationary motor drives and a continuous belt which runs along an H-shaped belt path. The H-shaped belt path matches the arrangement of the guide rails and the crossbar. If the two motor drives are driven both in the same rotary direction, the carriage is moved along the crossbar. If the two motor drives are driven in opposite rotary directions, the crossbar is moved along the guide rails.

In order to effect the movement of the tool carrier along the third axis and the rotation of the tool carrier around the third axis, two further H-shaped belts are provided. In summary, the known robot comprises three H-shaped belts which are arranged in parallel planes one above the other. An advantage of this robot design results from the stationary motor drives, with the drive forces being transferred to the tool carrier by means of the H-belts. The moveable part of the robot therefore does not need to carry the weight of the drives. Accordingly, the tool carrier can be made very lightweight, which allows highly dynamic movements with high accelerations and decelerations. Positioning accuracy, however, is limited with this known design, because the H-belt drive systems are susceptible to undesired rotations of the crossbar around its longitudinal axis and around the vertical Z-axis. Positioning inaccuracies resulting from such rotations may cause problems, in particular, if the tool carrier is moved very quickly, which should be a domain of this kind of robot design.

WO 97/02931 discloses further robot designs employing the H-belt approach. Again, however, the proposed designs are susceptible to positioning inaccuracies as a result of undesired rotations of the crossbar.

U.S. Pat. No. 4,976,582 discloses a completely different robot design, which is commonly known as Delta robot. The Delta robot also enjoys the benefit of stationary motor drives, which are configured to move a tool carrier via a parallel geometry. While this robot design also benefits from the low weight of the moving parts, it requires a sophisticated control logic in order to compute drive control signals from the desired movements of the tool carrier.

Beyond these two concepts, there are further robot designs, such as what is known as 6-axes-robot or what is called SCARA design. In order to allow movements along and around three or more axes, however, these robot designs require motor drives to be moved together with the tool carrier, which limits the dynamic behavior and/or requires high-power drive systems.

SUMMARY OF THE INVENTION

In view of the above, it is an object of the present invention to provide a multi-axis robot for high-speed applications, which is lightweight, efficient and inexpensive to implement. It is another object of the present invention to provide a multi-axis robot of the belt drive design having an increased positioning accuracy.

According to one aspect of the invention, this object is achieved by a A multi-axis robot for high-speed applications comprising a first and a second guide rail arranged substantially parallel to each other for defining a first axis of motion, a crossbar having a first end moveably supported on the first guide rail and a second end moveably supported on the second guide rail, a carriage moveably coupled to the crossbar for moving along a second axis of motion extending from the first end to the second end, a first drive system having first and second drives and a first belt running along a first H-shaped belt path for moving the crossbar and the carriage along the first and second axis of motion, and second and third belts extending at least partially along the crossbar and the guide rails, wherein the second and third belts run along different second and third belt paths, with one of the second and third belts entering the crossbar with a right-hand turn and leaving the crossbar with a left-hand turn, and the other one of the second and third belts entering the crossbar with a left-hand turn and leaving the crossbar with a right-hand turn.

The new robot thus follows the belt drive approach enjoying all the benefits resulting from this concept. Compared to prior art robots following this design, however, the new robot provides for an increased stability and rigidity due to the new belt design of the second and third belts. Since each of these two belts enter the crossbar with a turn in a first direction and leave the crossbar with a turn in a second, opposite direction, each belt stabilizes the crossbar against a rotation about the third axis of motion (typically Z-axis). In addition, the two belts are arranged such that they stabilize the crossbar in opposite rotary directions. Therefore, the second and the third belt together provide for the increased stability and rigidity, because any possible rotation of the crossbar around the third axis of motion is blocked and inhibited (or at least reduced) by one of the second and third belts. In other words, the second and the third belt cooperate by counteracting as a result of the new belt design.

The new belt design of the second and third belts is particularly useful for high-speed applications, where the crossbar is moved back and forth with high accelerations and decelerations. Since the second and the third belt stabilize the crossbar between the guide rails, the crossbar is kept more stably in its orientation relative to the guide rails. It is even possible to increase the stability to an extent that the guide rails can be made from lightweight materials including plastic, which further reduces the overall weight of the robot and its manufacturing costs. Another advantage resulting from the increased stability is the reduced wear and tear.

In summary of the above, the new multi-axis robot provides for an inexpensive design suitable for high-speed applications, but with an increased positioning accuracy at reduced costs. The above object is therefore completely achieved.

In a preferred refinement, said one of the second and third belts runs along a second belt path which is substantially d-shaped and said other one of the second and third belts runs along a third belt path which is substantially b-shaped.

As with the H-shaped belt path of the first belt, the second and third belts run along a d-shaped or b-shaped belt path, respectively, if seen in a top view. It goes without saying that the "letters" d and b could also be regarded as p and q depending on the point of view, because the belt paths according to this refinement are not symmetric. Therefore, the d-shaped and b-shaped belt paths are also to be understood as p-shaped and q-shaped belt paths in accordance with this refinement. In any case, the two belt paths are asymmetric by having a broader loop and a narrower loop which are arranged substantially transverse to one another. One belt part of the broader loop runs along or even in the crossbar, while the narrower loop runs substantially completely along one of the guide rails. It is within this refinement that side loops may be provided, such as a wrap around a pulley at the carriage, as long as the basic shape of the letters d and b (or p and q) is maintained.

This refinement has proven to provide for a very stable, easy to implement and inexpensive implementation. In particular, this refinement allows to arrange motor drives for the first, second and third belts at different ends of the two guide rails, which facilitates a very compact and stable construction.

In a further refinement, the new multi-axis robot comprises a tool carrier moveably coupled to the carriage for moving along a third axis of motion which is transverse to the first and second axis of motion.

This preferred refinement adds a third axis of motion to the basic concept of the new multi-axis robot, thereby increasing flexibility and handling capabilities.

In a further refinement, the new robot comprises a second drive system for moving the tool carrier along the third axis of motion, the second drive system comprising a third drive and the second belt.

Due to this refinement, the second belt does not only contribute to an increased stability and rigidity, but it also serves for driving the tool carrier along the third axis of motion. Consequently, this refinement allows for a very efficient and inexpensive design.

According to a further refinement, the second drive system comprises a fourth belt arranged in parallel and running simultaneously with the second belt.

In this refinement, the second belt is "mirrored" by a fourth belt, so that the second drive system effectively comprises two parallel belts running simultaneously to one another with a spacing in-between in the direction of the third axis of motion. Due to the doubled belts and the spacing in-between, this refinement further enhances the stability and rigidity of the new robot. In particular, the two spaced-apart belts contribute to reduced rotations of the crossbar along its longitudinal axis.

According to a further refinement, the carriage comprises a first part supporting the tool carrier and a second part connected to the second belt for a movement relative to the first part, and the robot further comprises a rope connecting the first and second parts and the tool carrier in such a way that a movement of the first and second part relative to one another results in a movement of the tool carrier along the third axis of motion.

In this refinement, the (typically vertical) movement of the tool carrier along the third axis of motion is effected by a relative movement of the first and second carriage parts. If the two parts are moved away from another, the tool carrier will typically be lifted up by means of the rope, while the tool carrier will typically move downwards, if the two carriage parts are moved toward each other. This refinement allows for a particularly lightweight construction of the moving carriage and tool carrier, thereby contributing to an even further increased dynamic. Basically, however, other designs could be used in order to transfer a translational movement of the second belt into a translational movement along the third axis of motion, such as a spindle arrangement using a screw nut.

In another refinement, the new robot comprises a third drive system for rotating the tool carrier about the third axis of motion, the third drive system comprising a fourth drive and the third belt.

This refinement also contributes to an efficient and inexpensive construction by using the third belt not only for stabilizing the crossbar, but also for driving the tool carrier.

In a further refinement, the third belt has a belt width which is substantially larger than a corresponding belt width of the second belt, and, preferably, also larger than a corresponding belt width of the first and fourth belt.

According to this refinement, the belt width measured transverse to the moving direction of the belt is increased for the third belt compared to the other belts. Alternatively, one could say that the belt width of the first and second belt may be reduced compared to the third belt. This refinement is particularly preferred in combination with other refinements, according to which the first and second belt are doubled by a corresponding "mirror belt", as explained further above with respect to the second and fourth belts. Since the third belt is not doubled in preferred refinements of the new robot, it is advantageous to increase its belt width compared to the other belts in order to enhance the transfer of the drive forces. The increased belt width of the third belt also contributes to the increased stability of the crossbar, if the second belt is doubled by the fourth belt, because the wider third belt can counteract drag forces on the second and fourth belt more effectively. It is especially preferred if the belt width of the third belt is substantially twice as big as the corresponding belt width of the second and the fourth belts if taken alone.

In a further refinement, the new robot comprises a fifth belt extending along an H-shaped fifth belt path, the fifth belt running in parallel and simultaneously with the first belt.

According to this refinement, the first belt is also mirrored by a fifth belt running in parallel and simultaneously, but with a spacing in the direction of the third axis of motion. Preferably, the first and fifth belt (like the second and fourth belt) each run on pulleys which are arranged on the same shafts. The doubled or mirrored first/fifth belt also contributes to an increased stability of the crossbar against rotations around its longitudinal axis. Arranging the respective pulleys on the same shafts contributes to a very compact and efficient design.

According to a further refinement, the second and third belts are located between the first and the fifth belt, if seen in a direction transverse to the first and second axis of motion. It is particularly preferred, if the first and fifth belts are the uppermost and lowermost belts, respectively, of the five belts discussed so far. In other words, the second, the third and the fourth belt are arranged in respective planes lying between a first plane defined by the belt path of the first belt and a fifth plane defined by the belt path of the fifth belt.

This refinement combines a compact design with a maximum spacing of the first and fifth belts along the third axis of motion, which is typically a vertical axis. The maximum spacing between the two parallel H-shaped belts provides for a particularly high stability of the crossbar against rotations around its longitudinal axis.

It goes without saying that the features explained above and those yet to be explained below can be used not only in the combination described, but also in other combinations or on their own without departing from the scope of the present invention.

BRIEF DESCRIPTION OF THE DRAWINGS

Exemplary embodiments of the invention are illustrated in the drawing and are explained in more detail in the description below. In the drawing:

FIG. 2 shows a schematic illustration for explaining the movements of an embodiment of the new robot along a first axis of movement, FIG. 3 shows a schematic illustration for explaining the movements of an embodiment of the new robot along a second axis of motion, FIG. 4 shows a schematic illustration for explaining the movements of an embodiment of the new robot along a third axis of motion, and FIG. 5 shows a schematic illustration explaining a rotational movement of an embodiment of the new robot.

DESCRIPTION OF PREFERRED EMBODIMENTS

Figure 1:
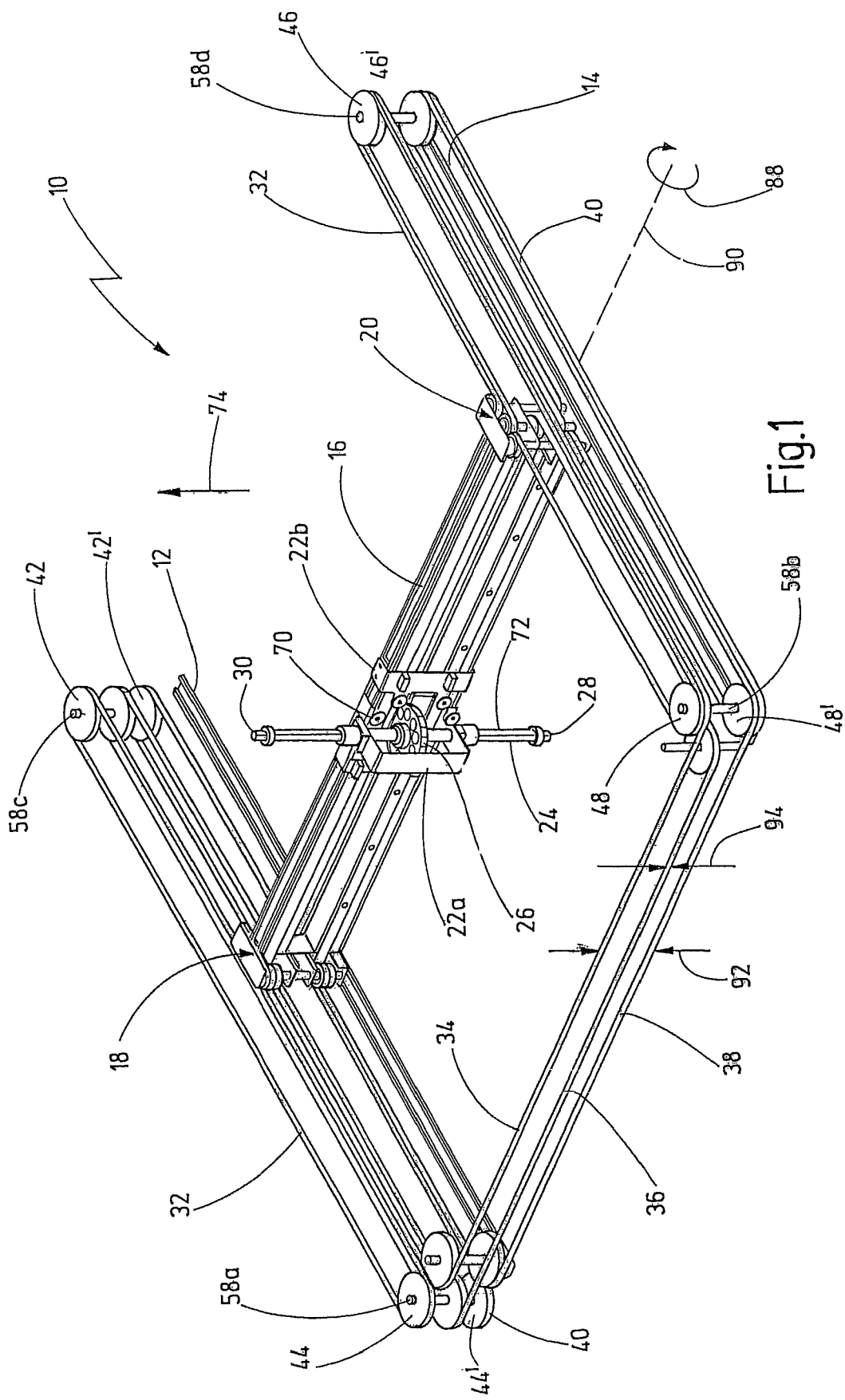
FIG. 1 shows essential parts of a preferred embodiment of the new multi-axis robot in a perspective view.

In FIG. 1, essential parts of an embodiment of the new robot are designated by reference number 10 in total. For sake of clarity, only parts of the new robot design, which are essential for the present invention, are shown here in detail. It goes without saying that the new robot actually comprises further parts not shown here, such as a general support structure, motor drives, housing parts and/or cover sheets and a controller for controlling the movements described later on. In a typical embodiment, the new robot comprises a substantially rectangular frame supported on four legs, with one leg on each corner of the frame. The frame supports two guide rails 12, 14, pulleys and the motor drives (not shown here in detail). The height of the legs and the length and width of the rectangular support frame might be chosen as appropriate for a desired application.

The new robot 10 also comprises a crossbar 16 having a first end 18 and a second end 20. The first end is supported on guide rail 12 by means of rollers configured to run along guide rail 12. The second end 20 is likewise supported on guide rail 14 by means of rollers. The rollers are schematically shown at reference number 21 in FIG. 4.

The crossbar 16 supports a carriage having a first carriage part 22a and a second carriage part 22b in the present embodiment. Carriage parts 22a, 22b are configured for a sliding movement along the crossbar 16 between the first end 18 and the second end 20. Carriage 22 supports a tool carrier 24, which is a rod-like shaft in the present embodiment. The tool carrier 24 is connected to a toothed wheel 26, which can be rotated by means of a belt drive in a manner explained further below. Rotating the toothed wheel 26 causes a rotation of rod-like tool carrier 24 around its longitudinal axis. The bottom end 28 of tool carrier 24 (and optionally upper end 30) are configured to receive any kind of handling tool (not shown here) that might be desired for a certain handling operation. Handling tools might include grippers for gripping workpieces and/or processing tools for processing a workpiece.

Robot 10 further comprises a plurality of pulleys arranged for guiding a plurality of belts. In the present embodiment, robot 10 comprises a first belt 32, a second belt 34, a third belt 36, a fourth belt 38, and a fifth belt 40. All these five belts are endless belts running along belt tracks which are explained in more detail in connection with FIGS. 2 to 5, which are also referred to in the following.

The first belt 32 is guided via four pulleys, 42, 44, 46, 48, with pulleys 42, 44 being arranged at the respective ends of the first guide rail 12 and with pulleys 46, 48 being arranged at the respective ends of second guide rail 14. In addition, first belt 32 is guided along four further pulleys 50, 52, 54, 56, wherein further pulleys 50, 52 are attached to the first end 18 of crossbar 16, and wherein further pulleys 54, 46 are attached to the second end 20 of crossbar 16. As can be seen from FIGS. 2 and 3, first belt 32 runs along a belt path which is essentially H-shaped.

Fifth belt 40 also runs along an H-shaped belt path which extends in parallel and preferably perfectly equal to the path of first belt 32. As can be seen from FIG. 1, fifth belt 40 is guided by pulleys 42', 44', 46', 48', which are arranged on the same shafts 58 as corresponding pulleys 42, 44, 46, 48 guiding the first belt 32, so that first and fifth belts 32, 40 always run simultaneously and parallel to one another. The same applies to pulleys 50, 52, 54, 56 at the ends 18, 20 of crossbar 16, which pulleys are likewise "mirrored" for guiding fifth belt 40.

In the present embodiment, drive shafts 58a and 58b arranged on parallel ends of guide rails 12, 14 each are connected to a motor drive. Those motor drives are not shown here in detail for sake of simplicity, but have been designated by reference numbers 60, 62 in FIGS. 2 and 3.

As will be well understood by the skilled person, H-shaped belts 32, 40 move the crossbar 16 along a first axis of motion 64, if the two drives 60, 62 are simultaneously operated, wherein one drive is operated counterclockwise, while the other one is operated clockwise. If the two drives 60, 62 are operated as indicated by respective arrows in FIG. 2, crossbar 16 will move in the direction of arrow 64. If each drive 60, 62 is operated in reverse direction, crossbar 16 will move in the opposite direction.

However, if drives 60, 62 are both operated clockwise (or both operated counterclockwise), the position of crossbar 16 will not change, but carriage 24 will be moved along crossbar 16. If both drives 60, 62 are simultaneously operated clockwise, carriage 24 will move in the direction of arrow 66, which indicates a second axis of motion. It goes without saying that carriage 24 is fixed to both belts 32, 50, by appropriate fasteners (not shown here in detail). In summary of the above, H-belts 32, 50 provide for translational movements of tool carrier 24 along two substantially orthogonal axes of motion.

FIG. 4 shows the path of second belt 34 (and the path of "mirrored" fourth belt 38). As can be seen, belts 34, 38 follow a belt path which is substantially d-shaped or p-shaped, depending on the point of view. In the present embodiment, second carriage part 22b is connected to belts 34, 38, while first carriage part 22a is connected to first and fifth belts 32, 40. Therefore, independent movement of second/fourth belts 34, 38 relative to first/fifth belts 32, 40 results in a movement of second carriage part 22b relative to first carriage part 22a in the direction of arrow 68. As can be seen from FIG. 1, each carriage part 22a, 22b comprises a pair of pulleys 70 for supporting a rope 72, which is connected to the bottom end 28 of tool carrier 24. Due to rope 72, tool carrier 24 will be lifted up along a third axis of motion 74 (FIG. 1), if carriage parts 22a, 22b are moved apart from one another, while tool carrier 24 moves down, if carriage parts 22a, 22b are moved towards each other. Therefore, second and fourth belts 34, 38 are configured to effect a movement of tool carrier 24 along the third axis of motion 74 (FIG. 1). In order to move belts 34, 38, a third drive 76 is arranged on the (second) end of guide rail 14.

As can be seen from FIG. 5, third belt 36 runs along a belt path that is substantially b-shaped (or q-shaped depending on the point of view). Third belt 36 is a toothed belt adapted to the toothed wheel 26 for engaging the teeth of toothed wheel 26. Therefore, third belt 36 is configured for effecting a rotary motion of tool carrier 24, as it is indicated by arrow 78. The respective drive for moving third belt 36 is schematically indicated by reference number 80. Drive 80 is arranged at the second free end of first guide rail 12, so that the four drives 60, 62, 76, 80 are located at the four corners defined by the free ends of the two guide rails 12, 14. The arrangement of belts 32 to 40 and drives 60, 62, 76, 80 is configured to effect four independent movements of tool carrier 24 along three translational axes and around one rotational axis.

As can be seen from FIGS. 4 and 5, belts 34, 36 and 38 each are guided around pulleys 82, 82' arranged at the second end 20 of crossbar 16. Due to the different belt paths, however, second and fourth belt 34, 38 wrap around pulley 82 at a side facing to drive 62, whereas third belt 36 wraps around pulley 82' at a side facing away from drive 62 and towards third drive 76. In other words, belts 34/38 and 36 provide different drag forces on pulleys 82, 82', which different drag forces act against each other, thereby stabilizing the second end 20 of crossbar 16 on guide rail 14.

Furthermore, second and fourth belts 34, 38 and third belt 36 also stabilize the first end 18 of crossbar 16 at guide rail 12 by providing counteracting drag forces to pulleys 84/84' and 86/86'. As a result, crossbar 16 is stabilized in its orthogonal position with respect to guide rails 12, 14, even if first and second drives 60, 62 provide slightly different drive forces to first and fifth belts 32, 40. A rotation of crossbar 16 around vertical axis 74, as it is indicated by reference number 78, is largely reduced, if not avoided.

In addition, a rotational movement 88 around longitudinal axis 90 of crossbar 16 (see FIG. 1) is also reduced, if not avoided, as a result of "mirrored" first and fifth belts 32, 40 and second and fourth belts 34, 38 and the respective vertical spacings, which are indicated by arrow 92 in FIG. 1.

Since third belt 36 is not "mirrored" in contrast to belt pairs 32/40 and 34/38, the width 94 of third belt 36 is twice as big as the corresponding widths of respective belts 32, 24, 28, 40 in the present embodiment.

As can be seen from FIGS. 4 and 5, second and fourth belts 34 enter crossbar 16 always with a turn to the right, and they leave crossbar 16 with a turn to the left. This holds true regardless of the direction of movement of second and fourth belts 34, 38. In contrast, third belt 36 always enters crossbar 16 with a turn to the left, and it leaves crossbar 16 with a turn to the right. Accordingly, the drive paths of belts 34/38 and 36 are different, and they provide counteracting drag forces on crossbar 16, which stabilize crossbar 16 in its orientation orthogonal to guide rails 12, 14.

What is claimed is:

1. A multi-axis robot for high-speed applications comprising
    a first and a second guide rail arranged substantially parallel to each other for defining a first axis of motion,
    a crossbar having a first end moveably supported on the first guide rail and a second end moveably supported on the second guide rail,
    a carriage moveably coupled to the crossbar for moving along a second axis of motion extending from the first end to the second end,
    a first drive system having first and second drives and a first belt running along a first H-shaped belt path for moving the crossbar and the carriage along the first and second axis of motion, and
    second and third belts extending at least partially along the crossbar and the guide rails,
    wherein the second and third belts run along different second and third belt paths, with one of the second and third belts entering the crossbar with a right-hand turn and leaving the crossbar with a left-hand turn, and the other one of the second and third belts entering the crossbar with a left-hand turn and leaving the crossbar with a right-hand turn.

2. The multi-axis robot of claim 1, wherein said one of the second and third belts runs along a second belt path which is substantially d-shaped and said other one of the second and third belts runs along a third belt path which is substantially b-shaped if seen in a direction transverse to the first and second axes of motion.

3. The multi-axis robot of claim 1, further comprising a tool carrier moveably coupled to the carriage for moving along a third axis of motion transverse to the first and second axis of motion.

4. The multi-axis robot of claim 3, further comprising a second drive system for moving the tool carrier along the third axis of motion, the second drive system comprising a third drive and the second belt.

5. The multi-axis robot of claim 4, wherein the second drive system comprises a fourth belt arranged in parallel and running simultaneously with the second belt.

6. The multi-axis robot of claim 4, wherein the carriage comprises a first part supporting the tool carrier and a second part connected to the second belt for a movement relative to the first part, and further comprising a rope connecting the first and second parts and the tool carrier in such a way that a movement of the first and second part relative to one another results in a movement of the tool carrier along the third axis of motion.

7. The multi-axis robot of claim 4, further comprising a third drive system for rotating the tool carrier about the third axis of motion, the third drive system comprising a fourth drive and the third belt.

8. The multi-axis robot of claim 7, wherein the third belt has a belt width which is substantially larger than a corresponding belt width of the second belt.

9. The multi-axis robot of claim 1, further comprising a fifth belt extending along an H-shaped fifth belt path, the fifth belt running in parallel and simultaneously with the first belt.

10. The multi-axis robot of claim 9, wherein the second and third belts are located between the first and the fifth belt, if seen in a direction transverse to the first and second axes of motion.

* * * * *